United States Patent
Faraj

(10) Patent No.: US 6,802,054 B2
(45) Date of Patent: Oct. 5, 2004

(54) GENERATION OF RUNTIME EXECUTION TRACES OF APPLICATIONS AND ASSOCIATED PROBLEM DETERMINATION

(75) Inventor: Mazen Faraj, North York (CA)

(73) Assignee: International Business Machines Corporation, Armonk, NY (US)

(*) Notice: Subject to any disclaimer, the term of this patent is extended or adjusted under 35 U.S.C. 154(b) by 607 days.

(21) Appl. No.: 09/925,395

(22) Filed: Aug. 9, 2001

(65) Prior Publication Data

US 2002/0073063 A1 Jun. 13, 2002

(30) Foreign Application Priority Data

Aug. 10, 2000 (CA) .............................. 2315449

(51) Int. Cl.$^7$ ............................ G06F 9/44; G06F 11/00
(52) U.S. Cl. ....................................... 717/128; 714/45
(58) Field of Search ............................... 717/124–135; 714/37–38, 45

(56) References Cited

U.S. PATENT DOCUMENTS

| | | | | |
|---|---|---|---|---|
| 6,598,012 B1 | * | 7/2003 | Berry et al. | 717/130 |
| 6,658,416 B1 | * | 12/2003 | Hussain et al. | 717/128 |
| 6,678,883 B1 | * | 1/2004 | Berry et al. | 714/45 |
| 6,728,949 B1 | * | 4/2004 | Bryant et al. | 714/45 |
| 6,728,955 B1 | * | 4/2004 | Berry et al. | 717/158 |
| 6,742,178 B1 | * | 5/2004 | Berry et al. | 717/128 |

OTHER PUBLICATIONS

Berndl et al. Dynamic Profiling and Trace Cache Generation. IEEE. 2003.*
Gueheneuc et al. No Java Without Caffeine. IEEE. 2002.*
Giannakopoulou et al. Automata–Based Verification of Temporal Properties on Running Program. IEEE. 2001. pp. 412–416.*
Silva et al. JRastro: A Trace Agent for Debugging Multi-threaded and Distributed Java Programs. IEEE. 2003.*
Jung et al. A Static Java Classfile Analyzer. IEEE. 2000. pp. 468–472.*

* cited by examiner

Primary Examiner—Wei Zhen
(74) Attorney, Agent, or Firm—Gregory M. Doudnikoff

(57) ABSTRACT

A computer system for generating and analyzing application trace data includes a monitor for launching Java language virtual machines using the Java Platform Debug Architecture to enable the virtual machines to generate event data on the occurrence of specified events during application execution on the virtual machines. The event data is placed on an event queue and the monitor removes the event data from the event queue for forwarding to a logging service. The logging service records the event data in a trace file. A set of problem determination tools use defined product description, and the trace file data to provide an analysis to a user based on a defined level of analysis selected by the user from product, component, code and logical levels of analysis.

25 Claims, 1 Drawing Sheet

GENERATION OF RUNTIME EXECUTION TRACES OF APPLICATIONS AND ASSOCIATED PROBLEM DETERMINATION

BACKGROUND OF THE INVENTION

1. Field of the Invention

The present invention is directed to an improvement in computing systems and in particular to an improved system for the generation of runtime execution traces of applications and for problem determination for such applications.

2. Description of the Related Art

The complexity of current software products creates difficulties for end users, and software developers, in performing problem determination when a failure occurs in a software product. Not only is the cause of a failure potentially difficult to determine at the component level, problem determination may be sometimes difficult at the product level, when multiple software products are used at the time of the failure.

Software developers and users rely on known techniques for carrying out problem determination for computer applications. Typically, a given software component or product will be designed to generate an execution trace at runtime (sometimes referred to as "product instrumentation"). An execution trace is typically used by the component developer during the development cycle and by the end user during product usage. The trace of an application is potentially valuable in component debugging and fine-tuning, performance analysis, and for first failure data capture needed at a runtime crash. Execution traces for an object-oriented product may typically include information such as class name, method name, method entry/exit events, entry/exit parameter values for methods, thread identifiers, and hostname information. The type of information to be captured in a trace is usually left up to the product developer, but such information should be detailed enough to help in problem determination and source identification should unexpected behaviour, or a crash, occur.

While it is possible to generate runtime traces by inserting trace code in an application to be traced, it is also desirable to automate the instrumentation process so that no code need be inserted in the application source code itself.

In applications designed using Sun Microsystems Inc.'s Java™ language, the problem of automating instrumentation has typically been addressed in two ways. The first is by instrumenting a specific Java virtual machine (VM) at a specific JDK (Java Developer Kit) level, and the second is by post-processing compiled Java byte code.

The first approach is used where a given Java VM includes a trace switch that can be used to enable/disable tracing at runtime. When a Java application is run on such a VM the VM will generate a runtime trace as specified by that VM's trace functionality. Although the approach does provide Java applications with the capability of producing trace files, this type of instrumentation is VM specific. It is necessary to run the application using the specific instrumented VM to be able to generate the execution trace.

Such an approach is not well suited to distributed applications. Such applications running on different VMs cannot be traced consistently unless the VMs are similarly instrumented. Where the instrumentation of the different VMs is not identical, consistency of the trace becomes an issue. If the different VMs are instrumented using different architectures, then there is a difficulty in merging the different traces together.

A second approach to automating instrumentation of Java applications is the post-processing of compiled Java byte code. This approach uses byte code manipulation libraries that enable the insertion and modification of byte code in a Java .class file so that the Java code generates an execution trace at runtime. This approach has the following two disadvantages. Firstly, modifying byte code potentially creates Java security problems. When a JAR file (Java archive file) is signed using JDK software tools, each file in the archive is given a digest entry in the archive's manifest. The digest values are hashes or encoded representations of the contents of the files as they were at the time of signing, and they will change if the file itself changes. Verifying a signed JAR file means that the digests of each of its files is to be re-computed and then compared with the digests recorded in the manifest to ensure that the contents of the JAR file haven't changed since it was signed. Hence, byte code modification will result in difficulties where the application to be traced is in a signed JAR file. The application will not pass the security verification step as a result of the modification to the byte files made for tracing purposes.

In addition, modifying the byte code means that the resulting code can no longer be easily debugged. Debuggers expect a certain match between Java source files and their corresponding compiled .class files. When the byte code in a .class file is modified, there is no longer a match between the source code line numbers and the new .class files.

Thus, as may be seen from the above description, there are significant limitations inherent in the prior art approaches to generating a runtime trace for Java applications.

A further aspect of problem determination relates to the ability, given a runtime trace of an application, to perform problem analysis in order to determine the cause of a failure. It is desirable to have an approach to problem determination that may be effective across multiple products and thus be able to provide information to a developer or user where more than one product is involved at the time the software failure occurred.

Although various problem determination tools exist, they are usually limited to analysing a specific trace of a specific product, and are not capable of dealing with multiple products. Also, they are not usually designed to be implemented in a plugable architecture and there is therefore a limited ability to reuse the same analysis product for different application products.

It is therefore desirable to have a mechanism for generating VM-independent traces of Java applications without byte-code manipulation, the mechanism having a problem determination tool able to be used with different applications.

SUMMARY OF THE INVENTION

According to one aspect of the present invention, an improved system is provided for the generation of execution traces of applications and for problem determination for applications.

According to another aspect of the present invention, a computer system is provided for generating application execution trace data, the computer system including a monitor for launching one or more virtual machines, the monitor defining the functional characteristics of each of the virtual machines prior to the launch of each of the virtual machines, each of the virtual machines being enabled by the monitor to generate event data on the occurrence of specified events during application execution on each of the virtual machines, the monitor further including means to receive the event data from each of the virtual machines and including means to forward the event data to a logging services component, and the logging services component including means for receiving event data and for generating trace data for storage in a trace file.

According to another aspect of the present invention, there is provided the above computer system in which the virtual machines are Java language virtual machines and in which the monitor enables the virtual machines to generate event data using application program interfaces supplied by the Java Platform Debug Architecture.

According to another aspect of the present invention, the means to receive the event data of the above computer system comprises an event queue in the monitor to which each of the virtual machines is enabled to write the event data and from which the monitor may read the event data.

According to another aspect of the present invention, monitor of the above computer system further comprises an interface to permit a user to selectively launch one or more of the virtual machines using a Java connector object.

According to another aspect of the present invention, the monitor further comprises a filter for defining a subset of the event data, the event data forwarded to the logging services component being restricted to the defined subset.

According to another aspect of the present invention, a computer program product is provided which includes a computer usable medium having computer readable program code means embodied in the medium for generating application execution trace data. The computer program product includes computer readable program code means for causing a computer to define the functional characteristics of a virtual machine whereby the virtual machine is enabled to generate event data on the occurrence of specified events during application execution on the virtual machine, and to send the event data to an event queue; computer readable program code means for causing the computer to launch the virtual machine and to execute one or more applications on the virtual machine; computer readable program code means for causing the computer to execute a logging service for storing trace data in a trace file; and computer readable program code means for causing the computer to retrieve the event data from the event queue and to forward the event data to the logging service for storage in the trace file.

Preferably, the virtual machine is a Java language virtual machine and in which the functional characteristics are defined to generate event data on the occurrence of specified events during application execution by the use of application program interfaces supplied by the Java Platform Debug Architecture.

The present invention also provides a method for generating application execution trace data, the method including the steps of defining the functional characteristics of a virtual machine whereby the virtual machine is enabled to generate event data on the occurrence of specified events during application execution on the virtual machine, and to send the event data to an event queue; launching the virtual machine and executing one or more applications on the virtual machine; initializing and running a logging service for storing trace data in a trace file; and retrieving the event data from the event queue and forwarding the event data to the logging service for storage in the trace file.

The present invention further provides a method for generating a Java application execution trace data, the method including the steps of defining a Java virtual machine using a monitor, whereby the monitor defines the virtual machine using the Java Platform Debug Architecture to enable the virtual machine to generate event data on the occurrence of specified events during application execution on the virtual machine, and to send the event data to an event queue, the monitor registering events with an event request manager; launching the virtual machine and executing one or more Java applications on the virtual machine; initializing and running a logging service for storing trace data in a trace file; and until event data specifying the termination of the virtual machine is retrieved, the monitor retrieving the event data from the event queue and forwarding the event data to the logging service for storage in the trace file.

The present invention also provides a Java language package for generating application execution trace data, the package including a monitor for launching one or more Java virtual machines, the monitor to define the functional characteristics of each of the Java virtual machines prior to the launch of each of the Java virtual machines, each of the Java virtual machines being enabled by the monitor, using the Java Platform Debug Architecture, to generate event data on the occurrence of specified events during application execution on each of the Java virtual machines, and to forward the event data to an event queue, and a logging services component for receiving the event data from the event queue and for generating trace data for storage in a trace file.

The monitor of the above Java package may comprise the event queue and the monitor retrieves the event data from the event queue and forwards the event data to the logging services component. Further, the monitor may comprise the event queue and a filter for defining a subset of the event data, the monitor retrieving the event data from the event queue and forwarding the subset of the event data to the logging services component. Also, the monitor may further comprise an interface to permit a user to selectively launch one or more of the virtual machines using Java connector objects.

The present invention may also provide a computer system for analyzing trace file data, the computer system including a problem determination tools component for reading one or more product descriptions and for reading the trace file data, each product description including rules, the problem determination tools component including an execution component for selectively executing the rules based on information contained in the trace file data, the problem determination tools component including a reporting component for generating and displaying data for a user based on the execution of the rules by the problem determination tools component. The computer system may further include means for a user to select between pre-defined sets of rules based on a level of analysis of the trace file required by the user. Further, the level of analysis may be selected from a group comprising a product level, a component level, a code level and a logical level.

Additionally, a computer system is provided for generating and analyzing application execution trace data, the computer system including a monitor for launching one or more virtual machines, the monitor defining the functional characteristics of each of the virtual machines prior to the launch of each of the virtual machines, each of the virtual machines being enabled by the monitor to generate event data on the occurrence of specified events during application execution on each of the virtual machines, the monitor further including means to receive the event data from each of the virtual machines and including means to forward the event data to a logging services component, the logging services component including means for receiving event data and for generating trace data for storage in a trace file, a problem determination tools component for reading one or more product descriptions and for reading the trace file data, each product description including rules, the problem determination tools component including an execution component for selectively executing the rules based on information contained in the trace file data, and the problem determination tools component including a reporting component for generating and displaying data for a user based on the execution of the rules by the problem determination tools component.

Advantages of the present invention include a computer system in which a trace of an application may be obtained without requiring additional instrumentation code being added to the source code of the application or to the byte code for the application. A further advantage is that the components of the system are reusable. The problem determination for the applications is able to provide specific information about unexpected or undesirable application execution based on pre-defined and modifiable product descriptions.

BRIEF DESCRIPTION OF THE DRAWING

The preferred embodiment of the invention is shown in the drawing, wherein.

Figure 1:
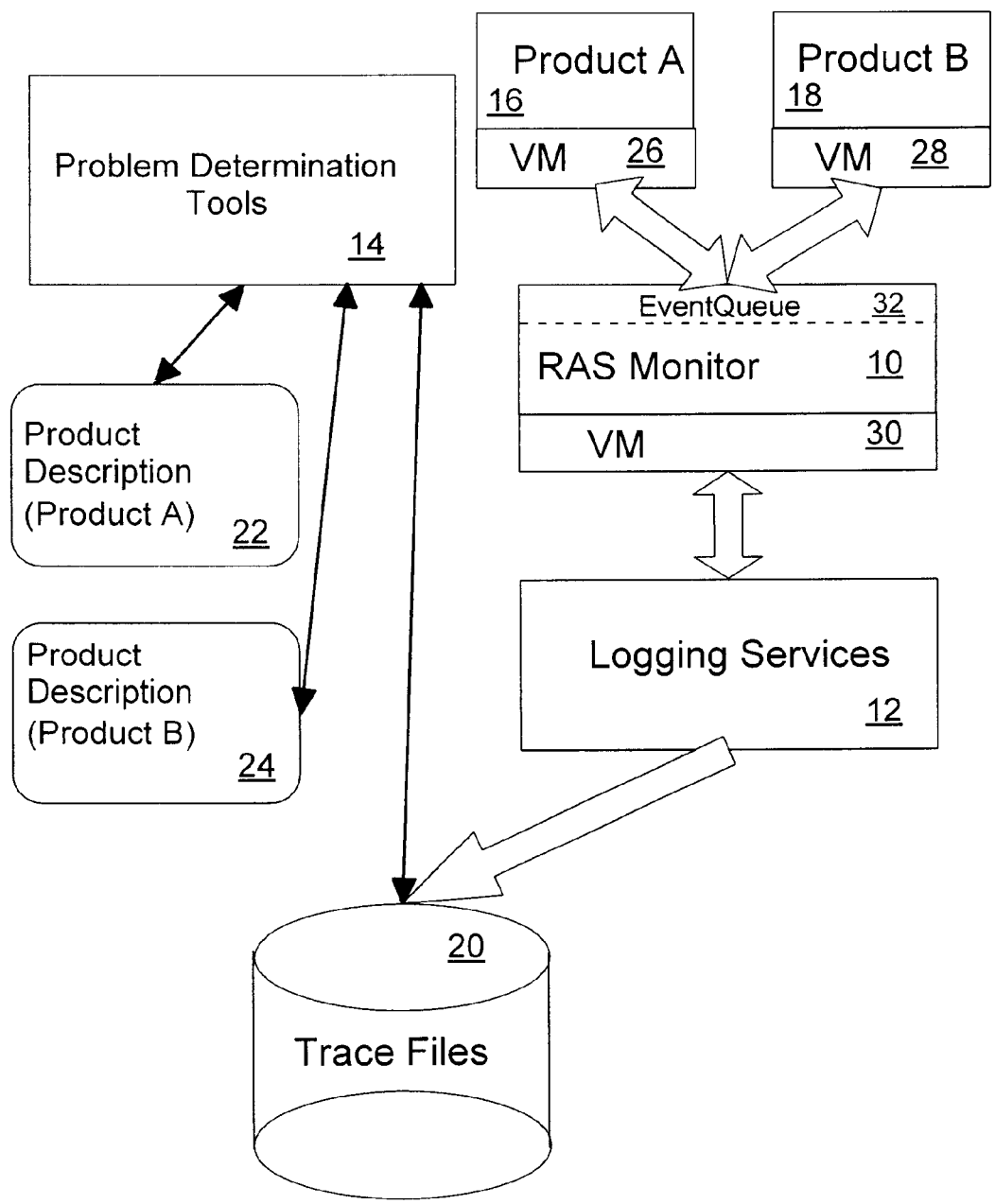
FIG. 1 is a block diagram illustrating the architecture of the preferred embodiment of the invention.

In the drawing, the preferred embodiment of the invention is illustrated by way of example. It is to be expressly understood that the description and drawings are only for the purpose of illustration and as an aid to understanding, and are not intended as a definition of the limits of the invention.

DESCRIPTION OF THE PREFERRED EMBODIMENT

FIG. 1 illustrates, in a block diagram, the architecture of an example configuration of the preferred embodiment. The preferred embodiment configuration of FIG. 1 includes an RAS monitor 10, a logging services component 12 and problem determination tools 14. FIG. 1 includes example applications shown as products 16, 18, representing a product A and a product B, respectively. In the example shown, execution of the products 16, 18 is traced by the preferred embodiment. The logging services component 12 logs data that is to be stored in trace files 20. The problem determination tools 14 access product descriptions 22, 24, which correspond to product A and product B, respectively.

In the preferred embodiment, the RAS monitor 10 is a Java application capable of launching virtual machines (VMs) and is implemented in accordance with the Sun Microsystems, Inc.'s Java 2 platform, and includes the Java 2 Debug architecture. According to the preferred embodiment, the products 16, 18 are Java applications that are launched through the RAS monitor 10.

The implementation of the RAS monitor 10 in the preferred embodiment utilizes the Java Platform Debugger Architecture and specifically the Java Debug Interface. The Java Debug Interface (JDI) is a high level Java API that may be used to provide information to debugging tools and similar systems where access to the running state of a virtual machine is desired. In the Java 2 platform, a Java virtual machine is required to support the Java Platform Debugger Architecture.

The RAS monitor 10 in the preferred embodiment is used to launch a Java VM for the Java application. In the example of the preferred embodiment shown in FIG. 1, the product 16 is shown running on a VM 26 and the product 18 is shown running on a VM 28. Each of the VMs 26, 28 are launched by the RAS monitor 10. The RAS monitor 10 includes calls to the JDI APIs to ensure that the VMs 26, 28 are launched with the appropriate event notification functionality. In the preferred embodiment, the RAS monitor 10 includes a user interface to permit a user to select the desired level of tracing capability. It will be understood by those skilled in the art that the debug interface provided by the JDI APIs utilized in the preferred embodiment may be used in different ways to instrument an application. The RAS monitor 10 may therefore launch VMs having different tracing capabilities. The customization of such VMs will vary between different implementations of the preferred embodiment. Implementation design for such different implementations is within the understanding of those skilled in the art.

The VMs 26, 28 are defined by the RAS monitor 10 using JDI APIs so as to generate events on defined conditions being met in the execution of applications by the respective VMs. The events as generated by the VMs 26, 28 are caught by the RAS monitor 10. The VMs 26, 28 place these events on an EventQueue 32, shown as part of the RAS monitor 10 in FIG. 1. FIG. 1 also shows the RAS monitor 10 running on its own VM 30.

The RAS monitor 10 uses the logging services component 12 to generate an execution trace (represented by trace files 20 in FIG. 1). Because the generation of the trace is carried out by the RAS monitor 10, the VMs 26, 28 as defined by the RAS monitor 10, and logging services component 12, the generation of the trace is transparent to the execution of the Java applications (the products 16, 18 in the example of FIG. 1). The logging services component 12 is separate from the actual engine that detects the trace and captures the data that is saved to a trace file.

As may be appreciated, the use of the JDI APIs to implement the trace function permits the application instrumentation to be carried out on different VMs. The preferred embodiment requires that the VMs launched by the RAS monitor 10 support the Java Debug Architecture. If this is the case, the instrumentation of the applications will be consistent. In this manner, distributed applications may be instrumented in a consistent fashion, despite the applications executing on VMs from different sources. As will be appreciated by those skilled in the art, the ability to generate such VMs will depend on a set of programming language APIs that implement standard debugging functions that may be used when launching a VM. The JDI APIs are used in the preferred embodiment as this set of APIs provides a significant trace functionality when used in the launch of a VM and the VM is subsequently used to execute applications.

As described in more detail below, the trace files 20 may be used directly by a user for error and debugging analysis. Alternatively, the problem determination tools 14 may be utilized. The problem determination tools 14 have available the data in trace files 20 and use the appropriate product descriptions (in the example of FIG. 1, the product descriptions 22, 24) to generate information for the user regarding the execution of the products being traced. The problem determination tools 14 may also make use of other information to generate information for the user regarding the execution of the product or application.

The operation of the preferred embodiment is set out below in more detail in relation to the example configuration shown in FIG. 1.

The RAS monitor 10 carries out several steps in launching the products 16, 18 and passing data to the logging services component 12 for generation of trace files 20. First (Step 1), the RAS monitor 10 establishes a connection to and launches a target VM to host the Java application to be traced. In the example of FIG. 1, Java applications are represented by the products 16, 18, and the launched target VMs are shown as the VMs 26, 28, respectively. The launch of a target VM may be achieved by using 'Connector' objects defined in the JDI. Connector objects encapsulate different ways of connecting an application (written using the JDI APIs) with the target VM. For example, a JDI application can attach to a currently running VM. Another approach is for the RAS monitor 10 to launch a target VM that will in turn launch a JDI application when needed (this latter approach is referred to as "Just-In-Time" debugging). The choice of method to launch a VM will be made by the developer implementing the RAS monitor 10, or alternatively may be user-selected.

In the preferred embodiment, although the RAS monitor 10 launches the target VMs 26, 28, the target VMs are immediately suspended until further instructions are received to permit other initialization steps to be carried out as described below.

Second (Step 2), the RAS monitor 10 is used to define the method of communication with the target VM. Depending on the platform, the Java Platform Debug Architecture implementation provides two potential methods of achieving this communication.

These include using shared memory or using sockets. The appropriate method for a given implementation of the preferred embodiment is selected in setting up the VMs 26, 28 for the products 16, 18 in the example of the preferred embodiment.

In a third step (Step 3), each implementation of the RAS monitor 10 defines the events to be monitored or traced in the application running on the VMs 26, 28. The RAS monitor 10 registers events with an EventRequestManager using EventRequest objects. When an event occurs in the application running on one of the VMs 26, 28 and for which an enabled request is registered, an EventSet is placed on the EventQueue 32. Examples of events that may go on the EventQueue 32 are exception events and method entry/exit events. In the preferred embodiment, the capability to generate such events results from the functionality of the Java Platform Debug Architecture. At this step, filtering may be applied to EventRequests such that not every event for which an enabled request is registered will result in notification. The user may specify such filtering or alternatively the RAS monitor 10 may define such filtering based on characteristics of the products being executed.

The definition of events to be monitored is made possible in the preferred embodiment by use of the JDI APIs. A developer may define a particular set of events to be monitored in a given VM. In this manner, the VM 26 and the VM 28 are able to be configured differently depending on the requirements of a user.

In the preferred embodiment, in a fourth step (Step 4) the logging services component 12 is responsible for creating a trace file and populating it with data captured from the VM launched in the previous steps (via the EventQueue 32 described in Step 3). The logging services component 12 is also initialized by the RAS monitor 10. The preferred embodiment also supports distributed logging. For example, a single centralized logging server may receive trace logs from a distributed application. In such a system, the RAS monitor 10 defines and initializes the logging services component 12 to support such a distributed application.

In a fifth step (Step 5), following the initialization steps set out above, the RAS monitor 10 triggers the execution of the Java application in the launched VM (for example, the product 16 on the VM 26). During such execution of the application, the RAS monitor 10 retrieves EventSets from the EventQueue 32. The EventQueue 32 captures all the EventSets generated by VM 26 because of the initialization and setup described in the third step above. Events are extracted from EventSets on the EventQueue 32 by the RAS monitor 10 and the data so captured is passed to the logging services component 12 to create a trace. This data can include a wide variety of information, such as the timeStamp for the current event, the name of the Class in which the event just occurred, the description of the event itself, method argument values, method return values, originating Host Name, originating Host Address, and current Thread Name. The data will be dependent on which aspects of the JDI APIs are selected by the user for the VM configuration, as described above. Such data is passed to the logging services component 12 for formatting and logging in the trace files 20.

In the sixth step (Step 6), the occurrence of a VMDeathEvent event provides the termination criteria. After the occurrence of this event, the RAS monitor 10 ceases to capture data from the EventQueue 32 for the VM in question.

The system of the preferred embodiment is able to monitor multiple Java applications (products) by creating multiple connector objects in Step 1, and following Steps 2 to 6.

In the system of the preferred embodiment, the logging services component 12 is a set of consistent API's available to the component or product developer for manual instrumentation of code. For example, in the prior art, to trace a Java application that is instrumented using logging services comparable to those implemented by the logging services component 12, the application requires initialization code to initialize the logging services. The initialization code typically includes the name of the trace file, socket initialization (if trace data is to be passed to another host), and the format and type of data to be written to the trace file. On every method entry or exit, code is added in the software component to populate the logging service APIs with data specific to this method. This is the type of data that is logged in the trace file in the prior art approach.

In contrast, the preferred embodiment uses such logging services by capturing the necessary data from the VM launched by the RAS monitor 10. This permits the tracing functionality to be independent from the application code itself. Instead, the RAS monitor 10 populates the APIs in a manner that provides functionality similar to tracing by manually adding code to the product but without the need to modify the product to add the code or to rely on VM-dependent tracing capabilities.

The preferred embodiment permits problem determination across multiple Java products. The preferred embodiment provides that an execution trace is generated during runtime with no additional tracing code in the original Java source code. As the trace that is generated by the preferred embodiment is product independent, multiple Java products may be traced which produces a consistent trace to enable problem determination over multiple products (applications).

Example 1 below shows an example of the trace that can be produced by these first two building blocks:

```
Product: <to be obtained from product description>
Version: <to be obtained from product description>
ComponentID: <to be obtained from product description>
TimeStamp; Tue Oct 26 21:53:28EDT 1999
Class: com.ibm.ras.logservice.implementation.Demo1
Event: MethodEntry
Method: methodA
Method Arguments: [java.lang.string] "string1"
Method return type: [int] 0
Message: <to be obtained from product description>
OriginatingHostName: mfaraj
OriginatingHostAdddress: 9.99.99.9999
ThreadName: main
OriginatingThreadName: main
```

EXAMPLE 1

Example 1 shows only one trace entry, but typically numerous entries are generated at runtime. The entries are self-explanatory to those skilled in the art, but certain fields are undetermined, such as the 'Product' field. This is because the information for the 'Product' field is deduced from the Product description files when the problem determination tools 14 are executed, as described below. The trace shown in Example 1 illustrates the information available in the trace files 20. The approach described above permits consistent traces to be generated across different Java platforms.

Turning to the problem determination aspect of the preferred embodiment, the problem determination tools 14 will now be discussed. These are a set of tools that perform trace analysis on the trace files 20, based on the product descriptions 22, 24. An execution trace, as stored in the trace files 20, is analysed based on the user's requirements. The preferred embodiment provides four levels of analysis. These comprise product level analysis, component level analysis, code or language level analysis, and logical level analysis. These levels define the type of analysis that is to be performed on the trace data before displaying information about the execution of an application to the user. The product description potentially includes descriptions of the product relevant to each of the four levels of analysis. The product description may be implemented in different formats, depending on the use to be made of the system of the preferred embodiment.

An example product description is provided in Example 2, which follows:

```
Product Name: product A
Version: 1.0
Component List: component X, component Y
Component Info:
    component X:
        ID: 123
        package names: com.ibm.xyz.*, com.ibm.abc.*
        version: 1.0
        intra-product dependencies: component Y: version 2.0+
        inter-product dependencies: none
        rules:
        <rule 1>
            <trace>
                        Class:
                            com.ibm.ras.logservice.implementation .Demo1
                        Event: MethodExit
                        Method: methodA
                        Method Arguments: [Java.lang.string [] ]
                        Method return type: [int] 0
                <result>
                        Message: "methodA terminated successfully"
            <rule2>
                <trace>
                        Class: com.ibm.ras.logservice.implementation.Demo1
                            Event: MethodExit
                            Method: methodA
                            Method Arguments: [Java.lang.String [] ]
                            Method return type: [int] -1
                    <result>
                            Message: "methodA terminated abruptly -
                                    could not find resource X"
    component Y:
        ID: 678
        package names: com.ibm.def.*
        version: 2.01
        intra-product dependencies: none
        inter-product dependencies:
                product B: version 2.0: component Z: version 2.0+
        rules:
          <logical>
                        Class: com.ibm.ras.logservice.implementation.Demo1
                            Event: MethodExit
                            Method: methodB
                            Method Arguments: [Java.lang.String [] ]
                            Method return type: [int]
                    <result>
                            Message: "Logical message from method B"
Product rules:
            pre-requisites: product B: version 2.0
            rules:
            <rule1>
                <installed>
                    product B: version xxx
                <result>
                        Message: "Product B version 2.0 is a pre-requisite
                                to this product. You are currently
                                at an undetermined version of Product
                                B. Please make sure that you have
                                product B , version 2.0 properly
                                installed"
Product XML DataBase Location:
            www.software.ibm.com/support/product-A-DB.xmlExample
```

EXAMPLE 2

Sample Product Description File

The product description defined for a given application (or product) provides specific information about the product that is used by the problem determination tools 14 to interpret data in trace files 20 for presentation to the user. The format of the data in the product description file is dependent on the details of the implementation of the preferred embodiment. XML is a suitable format for such a structured data representation. In Example 2, a sample description of a product is provided. As will be noted by those skilled in the art, the description in Example 2 is provided in a format close to XML. The preferred embodiment may be implemented to include product descriptions in XML standard format.

The product description of Example 2 defines the name of the product to be traced and the version number (Product Name: product A; Version: 1.0). The product is defined to have two components: X and Y (Component List: component X, component Y).

The product description of Example 2 includes component information for the two defined components X and Y. Component X is defined to have an ID of 123, to be version 1.0 and to be defined by two specified packages (Component Info: component X: ID: 123; package names: com.ibm.xyz.*, com.ibm.abc.*; version: 1.0). The product description of Example 2 indicates that component X has a dependency on another component within the same product A, called component Y, and that this component Y has to be at version 2.0 or above for component X to function correctly (intra-product dependencies: component Y: version 2.0+). The product description also specifies that component X does not depend on any components from another product (inter-product dependencies: none).

The component X definition shown in Example 2 also includes two trace rule definitions (<rule1> and <rule2>). These rules are defined to permit the problem determination tools 14 to provide messages to the user based on trace data that may be sent to the trace files 20 by the logging services component 12. In Example 2, component X currently has two rules that define what a trace message should be for methodA of class com.ibm.ras.logservice.implementation.Demo1. If the return value of the methodA is 0, then the message should be "MethodA terminated successfully". Otherwise, if the return value is −1, then the message should be "Method A terminated abruptly—Could not find resource X". By defining trace rules in this manner, the user may be provided with detailed messages without the product itself incorporating the code to generate such messages. The messages may be altered by accessing the product definition, or the product definition may specify that some action other than message passing be carried out for different method return types or values.

Information for component Y is also provided in the product description of Example 2. In this case, component Y does depend on a components from another product, specifically component Z from Product B (inter-product dependencies: product B: version 2.0: component Z: version 2.0+). For component Y to function correctly, Product B has to be at version 2.0, and component Z of this product B has to be at version 2.0 or above.

Component Y in Example 2 has a logical rule associated with it. The product description file of Example 2 also includes a product rules section. In the example, the product rules section defines a prerequisite for Product A: Product B version 2.0 must be installed properly before Product A will function properly. The last statement in Example 2 defines a database location to permit the problem determination tools 14 to connect to an XML database for further analysis.

As may be seen from the description shown in Example 2, characteristics of the applications (products) to be traced by the preferred embodiment may be specified in the product descriptions 22, 24, for use by the problem determination tools 14 where the trace files 20 contain data from the runtime execution of products 16, 18. The product descriptions 22, 24 may provide definitions of different aspects of the products 16, 18. As indicated above, the preferred embodiment uses four levels of analysis of the characteristics of products (product level, component level, code level and logical level0. A description of how these analyses are carried out using the example of the product description shown in Example 2 is set out below.

When a user selects a product level analysis, the problem determination tools 14 parse the appropriate execution trace files 20 and, for every package referenced in the trace, will determine the corresponding product that includes it in its product description. Also, for each product reflected by this current trace, the problem determination tools 14 will execute the set of rules included in the "Product Rules" section of the product description. A list of products that generated the trace data in the trace files 20 is displayed to the user, potentially accompanied by a high level analysis of these products.

For example, in the above product description of Example 2, if the problem determination tools 14 determines that Product A has generated data in the trace files 20, the problem determination tools 14 parses the product rules section of the product description for Product A (the product description 22). If the product description 22 is the Example 2 description, the problem determination tools 14 determine that Product A requires Product B to be installed at version 2.0 or higher. The product determination tool 14 will then determine if Product B is, in fact, installed at version 2.0.

This is done by referring to the "Product Rules" section of Product B, and performing another Product Level analysis on it (i.e., it is a recursive process). If Product B is not properly installed, then the rule executes and the problem determination tools 14 will cause an appropriate message to be displayed to the user, such as "Product B version 2.0 is a pre-requisite to this product. You are currently at an undetermined version of Product B. Please make sure that you have Product B, version 2.0 properly installed." Otherwise, the analysis will simply reveal that Product A is being used in the trace, and product pre-requisites are satisfied.

The above example illustrates how the preferred embodiment is of benefit in tracing execution of products. The trace is analyzed dynamically. The installation of an incompatible version of Product B may not be caught by a standard product install because at the time that Product A is installed, Product B might have been at the correct version level. However, at runtime, when this execution trace was generated, the environment may have changed and a different version of Product B may have been installed. This is caught by the preferred embodiment, as described in the above example.

It is such product dependencies that are captured at this level of analysis. Other similar product level analyses are possible for a product, based on how the product description files are defined.

A similar series of steps is carried out by the preferred embodiment when the user selects a component level analysis. The problem determination tools 14 perform an analysis at the component level by identifying each component involved in the trace (each component generating data for trace files 20). The problem determination tools 14 determine the current version of each component from the appropriate product description file, and analyzes the intra-product and inter-product dependencies associated with the component.

For example, in the product description of Example 2, if the current trace is determined to have used components X and Y (i.e., there was at least one method called in a class that is in those component packages), then a list showing these two components (including their current versions and Ids) is generated for the user.

In the product description of Example 2, intra- and inter-dependencies of components are specified and are therefore analyzed by the problem determination tools 14 during the component level analysis. Component X, which is currently at level 1.0, is defined to require component Y to be at least at version 2.0 or above. The same product description indicates that Component Y is at version 2.01, and the component analysis for Component X does not identify a problem. In Example 2, Component Y does not have any intra-product dependencies, but it does have inter-product dependencies. Here the problem determination tools 14 determine if Product B, version 2.0 is installed and also that Component Z in Product B is at least at version 2.0. This is determined by performing a component level analysis for this component using the product description 24 (Product B's description file). As this example shows, the component level of analysis is potentially a recursive process, relying on multiple description files (as indicated above, the product level analysis has the same characteristic).

As may be seen from the above description, the product level and the component level analysis will result in messages being generated as defined in the product descriptions, based on information found in the trace file to be analyzed. For neither of these levels of analysis is the trace data itself presented to the user in the preferred embodiment.

In the third level of analysis, the code level analysis, actual trace data is displayed to the user. In the preferred embodiment such trace data includes reference to all method entry/exit events, and all the parameter values. In the preferred embodiment a graphical display of the data reflecting events from the product's runtime facilitates problem determination as the user is able to visually determine the execution path that the application followed.

By using the product and component analyses in conjunction with the code level analysis, the user will be able to consider the list of components in the multiple products used in the application. The user can narrow down to a component level the possible cause of an incorrect execution path, for example.

The product descriptions 22, 24 are also useful in enhancing the code level analysis. For example, in Example 2, Component X has two trace rules associated with it that define what message is to be displayed at the code level analysis, based on the return type of MethodA. In the example, if the method com.ibm.ras.logservice.implementation.Demo1.methodA( ) is found in the trace, the return value of the method is determined, and the appropriate rule is executed, defining what the display message should be in the visual display of the trace.

Finally, the logical level of analysis is based on rules tagged 'logical' in the product descriptions 22, 24. Where a logical rule is met by the trace data, a message may be substituted for the trace data itself. In Example 2, there is only one logical rule associated with Component Y and it is interpreted at this level as follows. If MethodB in class com.ibm.ras.logservice.implementation.Demo1 returns successfully, the problem determination tools component 14 does not display that part of the execution trace corresponding to the execution of the application leading up to the execution of the specified method. In the example provided, the result will be the trace data for execution occurring after MethodB being displayed.

The logical level analysis permits the user to define rules that depend on how the product executes to minimize the amount of trace data displayed to the user. Where the user or developer is able to determine that certain trace data is unnecessary in certain circumstances, logical rules can be defined to suppress the trace data in those circumstances.

A further type of analysis that may be carried out by the problem determination tools 14 relates to the location of a database specified in a product description. In the preferred embodiment, this database would typically be maintained and updated by the corresponding product support team. For instance, once code level analysis is performed and a specific method triggers a rule that defines a message, then the specified database can be searched for the message to determine the cause of the problem and how to resolve it. The database effectively stores information about known bugs, and information about known public fixes for it. Such a database provides a further source of information available in the analysis of the trace files 20.

Those skilled in the art will appreciate that the format selected for the product description files may vary between different implementations of the preferred embodiment. The format selected for the product descriptions being tied to the parsing capabilities of the problem determination tools for a given implementation.

The RAS monitor 10 in the preferred embodiment provides for both minimal product (application) size and a reusable architecture. Minimal component size is achieved by the fact that no trace/debug specific code needs to be added to the application to be traced. A reusable architecture is achieved by the fact that since the entire trace/debug code needed to generate the data for a trace is the stand-alone component RAS monitor, a component that may be easily reused. There is no dependency between the Java application to be traced and the RAS monitor code, other than the Java application must support the Java Platform Debugger Architecture JDI.

Ease of modifying the logging architecture is achieved by the fact that the logging services component 12 of the preferred embodiment is defined as a plugable component that can be easily modified, updated or even replaced by a different component from another logging architecture. Other logging services able to receive data, format it and log it to a file in the trace files 20 will be usable in the architecture of the preferred embodiment. Because the RAS monitor 10, including the logging service code, is not part of the application to be traced, if there is a need to change the format or the information in the trace, there is no necessary development impact on the product (application) itself.

Also, this approach is VM independent because of the fact that the Java Platform Debug Architecture is itself VM independent. Because this architecture is defined as debugging support for the Java 2 platform, the preferred embodiment will trace any Java application running on any VM as long as the VM supports the required JPDA APIs.

Finally, problem determination over multiple products is achieved by having one consistent trace and having separate product description files for use by the problem determination tools. Both of these are product independent. The trace is automated by the first two modules. The problem determination tools do not rely on any code embedded in a product but rely on the product description files. Hence, cross product problem determination is achieved. As problem determination now relies on one consistent trace and on product descriptions, and since the generation of the trace is automated, multiple Java products are able to plug into the architecture of the preferred embodiment by providing their respective product description. This provides the user with the ability to view the complete execution path that a given application took, spanning multiple products, to understand potentially complex runtime execution of the application.

As the above description indicates, the generation of a runtime execution trace, is achieved in the preferred embodiment by the use of Java Debug APIs in conjunction with logging service APIs. With this consistently generated trace data, performing problem analysis over multiple products may be carried out in the preferred embodiment by analysing the trace data in conjunction with the defined product description files.

The detailed descriptions may have been presented in terms of program procedures executed on a computer or network of computers. These procedural descriptions and representations are the means used by those skilled in the art to most effectively convey the substance of their work to others skilled in the art. They may be implemented in hardware or software, or a combination of the two.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, objects, attributes or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention. The operations are machine operations. Useful machines for performing the operations of the present invention include general purpose digital computers or similar devices.

Each step of the method may be executed on any general computer, such as a mainframe computer, personal computer or the like and pursuant to one or more, or a part of one or more, program modules or objects generated from any programming language, such as C++, Java, Fortran or the like. And still further, each step, or a file or object or the like implementing each step may be executed by special purpose hardware or a circuit module designed for that purpose.

In the case of diagrams depicted herein, they are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

Throughout the description and claims of this specification, the word "comprise" and variations of the word, such as "comprising" and "comprises", is not intended to exclude other additives, integers or processed steps.

While the preferred embodiment of this invention has been described in relation to the Java language, this invention need not be solely implemented using the Java language. It will be apparent to those skilled in the art that the invention may equally be implemented in other computer languages, such as object oriented languages like C++ and Smalltalk.

The invention is preferably implemented in a high level procedural or object-oriented programming language to communicate with a computer. However, the invention can be implemented in assembly or machine language, if desired. In any case, the language may be a compiled or interpreted language.

While aspects of the invention relate to certain computer language and other technological specifications (e.g., the Java Platform Debug Architecture and the Java Debug Interface), it should be apparent that classes, objects, components, interfaces and other such software and technological items referenced herein need not fully conform to the specification(s) defined therefor but rather may meet only some of the specification requirements. Moreover, the classes, objects, components, interfaces and other such software and technological items referenced herein may be defined according to equivalent specification(s) other than as indicated herein that provides equivalent or similar functionality, constraints, etc.

The invention may be implemented as a computer program product comprising a computer usable medium having computer readable program code means therein for executing the method steps of the invention, a program storage device readable by a machine, tangibly embodying a program of instructions executable by a machine to perform the method steps of the invention, or a computer program product generally. Such computer program products and/or program storage device may include, but is not limited to, CD-ROMs, diskettes, tapes, hard drives, computer RAM or ROM and/or the electronic, magnetic, optical, biological or other similar embodiment of the program. Indeed, the computer program products and/or program storage device may include any solid or fluid transmission medium, magnetic or optical, or the like, for storing or transmitting signals readable by a machine for controlling the operation of a general or special purpose programmable computer according to the method of the invention and/or to structure its components in accordance with a system of the invention.

The invention may also be implemented in a system. A system may comprise a computer that includes a processor and a memory device and optionally, a storage device, an output device such as a video display and/or an input device such as a keyboard or computer mouse. Moreover, a system may comprise an interconnected network of computers. Computers may equally be in stand-alone form (such as the traditional desktop personal computer) or integrated into another apparatus (such a cellular telephone). The system may be specially constructed for the required purposes to perform, for example, the method steps of the invention or it may comprise one or more general purpose computers as selectively activated or reconfigured by a computer program in accordance with the teachings herein stored in the computer(s). The procedures presented herein are not inherently related to a particular computer system or other apparatus. The required structure for a variety of these systems will appear from the description given.

While this invention has been described in relation to preferred embodiments, it will be understood by those skilled in the art that changes in the details of construction, arrangement of parts, compositions, processes, structures and materials selection may be made without departing from the spirit and scope of this invention. Many modifications and variations are possible in light of the above teaching. Thus, it should be understood that the above described embodiments have been provided by way of example rather than as a limitation and that the specification and drawing(s) are, accordingly, to be regarded in an illustrative rather than a restrictive sense.

The embodiments of the invention in which an exclusive property or privilege is claimed are defined as follows:

1. A computer system for generating application execution trace data, the computer system comprising:

first means for launching one or more virtual machines, defining functional characteristics of each of the virtual machines prior to launching each of the virtual machines, and enabling each of the virtual machines to generate event data on occurrence of specified events during application execution on each of the virtual machines;

second means for receiving the event data from each of the virtual machines and forwarding the event data;

third means for receiving the event data and for generating trace data for storage in a trace file.

2. The computer system for generating application execution trace data of claim 1, wherein the virtual machines are Java language virtual machines and wherein said first means enables the virtual machines to generate event data using application program interfaces supplied by Java Platform Debug Architecture.

3. The computer system for generating application execution trace data of claim 2, wherein said third means comprises an event queue to which each of the virtual machines is enabled to write the event data and from which said third means may read the event data.

4. The computer system for generating application execution trace data of claim 2, wherein said first means further comprises an interface to permit a user to selectively launch one or more of the virtual machines using a Java connector object.

5. The computer system for generating application execution trace data of claim 2, wherein said first means further comprises a filter for defining a subset of the event data, and the event data forwarded to the logging services component is restricted to the defined subset.

6. Computer readable code stored on a computer usable medium for generating application execution trace data, said computer readable code comprising:
  first computer readable program code means for causing a computer to define functional characteristics of a virtual machine so that the virtual machine is enabled to generate event data on occurrence of specified events during application execution on the virtual machine;
  second computer readable program code means for causing the computer to receive the event data from the virtual machine and to forward the event data to a logging service; and
  third computer readable program code means for causing the logging service to generate trace data and to store trace data in a trace file.

7. The computer readable code of claim 6, wherein the virtual machine is a Java language virtual machine and wherein the functional characteristics are defined to generate event data on the occurrence of specified events during application execution by use of application program interfaces supplied by a Java Platform Debug Architecture.

8. The computer readable code of claim 7, further comprising fourth computer readable program means for providing and displaying user interface to permit a user to selectively launch one or more virtual machines using a Java connector object.

9. The computer readable code of claim 6, in which said third computer readable program code means comprises an event queue to which the virtual machine is enabled to write the event data and further comprising computer readable program code means for causing the computer to retrieve said event data from the event queue and to forward said event data to the logging service for storage in the trace file.

10. The computer readable code of claim 6, further comprising fifth computer readable program means for filtering the event data to provide a subset of the event data, wherein only the subset of the event data is forwarded to the logging service.

11. A method for generating application execution trace data in a computing environment, said the method comprising the steps of:
  defining functional characteristics of a virtual machine so that the virtual machine is enabled to generate event data on occurrence of specified events during execution of an application on the virtual machine and to send the event data to an event queue;
  launching the virtual machine and executing one or more applications on the virtual machine;
  initializing and running a logging service for storing trace data in a trace file;
  generating event data upon the occurrence of specified events;
  sending the event data to the event queue;
  then forwarding the event data to the logging service; and
  storing the event data in the trace file.

12. A method for generating a Java application execution trace data according to claim 11, wherein a monitor defines the Java virtual machine using the Java Platform Debug Architecture to enable the virtual machine to generate the event data on the occurrence of specified events during execution of an application on the virtual machine and to send the event data to the event queue, the monitor registering events with an event request manager, the monitor retrieving the event data from the event queue and forwarding the event data to the logging service for storage in the trace file until event data specifying the termination of the virtual machine is retrieved.

13. Java language package for generating application execution trace data, the package comprising:
  a monitor for launching one or more Java virtual machines, said monitor defining functional characteristics of each of the Java virtual machines prior to launch of each of the Java virtual machines, each of the Java virtual machines being enabled by the monitor, using Java Platform Debug Architecture, to generate event data on occurrence of specified events during application execution on each of the Java virtual machines and to forward the event data to an event queue; and
  a logging services component for receiving the event data from the event queue and for generating trace data from the event data for storage in a trace file.

14. The Java package for generating application execution trace data according to claim 13, wherein the monitor comprises the event queue and the monitor retrieves the event data from the event queue and forwards the event data to the logging services component.

15. The Java package for generating application execution trace data according to claim 13, wherein the monitor comprises the event queue and a filter for defining a subset of the event data, the monitor retrieving the event data from the event queue, filtering the retrieved event data to define the subset of the event data and forwarding the subset of the event data to the logging services component.

16. The Java package for generating application execution trace data according to claim 13, wherein the monitor further comprises a user interface compartment which may be displayed to a user to permit the user to selectively launch the one or more of the virtual machines using Java connector objects.

17. In a computing environment, a system for analyzing trace file data, said system system comprising:
  means for reading one or more product descriptions and for reading trace file data, each of the product descriptions comprising rules;
  means for selectively executing the rules based on information contained in the trace file data; and
  reporting means for generating and displaying data for a user based on the execution of the rules by said executing means.

18. The system for analyzing trace file data according to claim 17, further comprising means for permitting a user to select between pre-defined sets of rules based on a level of analysis of the trace file data required by the user.

19. The system for analyzing trace file data according to claim 18, wherein the level of analysis is selected from a group comprised of product level, component level, code level and logical level.

20. In a computing environment, a system for generating and analyzing application execution trace data, the said system comprising:

- means for defining functional characteristics of virtual machines prior to launch of each of the virtual machines, each of the virtual machines being enabled by said defining means to generate event data on occurrence of specified events during application execution on each of the virtual machines;
- means for launching each of the virtual machines;
- means for receiving the event data and for generating trace data based on the received event data for storage in a trace file;
- means for reading one or more product descriptions and for reading the trace data from the trace file, wherein each of the product descriptions comprise rules;
- means for selectively executing the rules based on information contained in the trace data; and
- means for generating and displaying data for a user based on the execution of the rules by said executing means.

21. A computer program product for analyzing trace file data, the computer program product comprising:

- first computer readable program code means for causing a computer to read one or more product descriptions and trace file data, each of the product description comprising rules;
- second computer readable program code means for causing a computer to selectively execute the rules based on information contained in the trace file data; and
- third computer readable program code means for causing a computer to generate and display data for a user based on the execution of the rules.

22. The computer program product of claim 21, further comprising fourth computer readable program code means for causing a computer to permit the user to select between pre-defined sets of rules based on a level of analysis of the trace file data desired by the user.

23. The computer program product of claim 21, wherein the level of analysis is selected from a group comprised of product level analysis, component level analysis, code level analysis and logical level analysis.

24. A computer program product for generating and analyzing application execution trace data, the computer program product comprising:

- first computer readable program code means for defining functional characteristics of one or more virtual machines prior to launch of each of the virtual machines, each of the virtual machines being enabled to generate event data upon occurrence of specified events during application execution on each of the virtual machines;
- second computer readable program code means for launching the one or more virtual machines;
- third computer readable program code means for receiving the event data from each of the virtual machines and for generating trace data for storage in a trace file;
- fourth computer readable program code means for reading one or more product descriptions and the trace data, each of the product descriptions comprising rules;
- fifth computer readable program code means for selectively executing the rules based on information contained in the trace data; and
- sixth computer readable program code means for generating and displaying data for a user based on the execution of the rules.

25. A computer program product comprising computer readable program code means embodied in medium for generating application execution trace data, said computer program product comprising:

- first computer readable program code means for defining functional characteristics of a virtual machine, wherein the virtual machine is enabled to generate event data upon occurrence of specified events during application execution on the virtual machine, and to send the event data to an event queue;
- second computer readable program code means for launching the virtual machine and executing one or more applications on the virtual machine;
- third computer readable program code means for retrieving the event data from the event queue and storing the event data in a trace file based on the retrieved event data.

* * * * *

UNITED STATES PATENT AND TRADEMARK OFFICE
CERTIFICATE OF CORRECTION

PATENT NO. : 6,802,054 B2
APPLICATION NO. : 09/925395
DATED : October 5, 2004
INVENTOR(S) : Mazen Faraj It is certified that error appears in the above-identified patent and that said Letters Patent is hereby corrected as shown below:

Column 17,
Line 44, replace "8. The computer readable code of claim 7" with -- 8. The computer readable code of claim 6 --.
Line 49, replace "9. The computer readable code of claim 6" with -- 9. The computer readable code of claim 7 --.

Signed and Sealed this

Twenty-seventh Day of June, 2006

JON W. DUDAS
*Director of the United States Patent and Trademark Office*